United States Patent
De La Barre et al.

(10) Patent No.: US 8,319,824 B2
(45) Date of Patent: Nov. 27, 2012

(54) METHOD FOR THE AUTOSTEREOSCOPIC PRESENTATION OF IMAGE INFORMATION WITH ADAPTATION TO SUIT CHANGES IN THE HEAD POSITION OF THE OBSERVER

(75) Inventors: René De La Barre, Mittweida (DE); David Przewozny, Berlin (DE); Siegmund Pastoor, Berlin (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 734 days.

(21) Appl. No.: 12/346,062

(22) Filed: Dec. 30, 2008

(65) Prior Publication Data
US 2009/0123030 A1 May 14, 2009

Related U.S. Application Data

(63) Continuation of application No. PCT/EP2007/004704, filed on May 26, 2007.

(30) Foreign Application Priority Data

Jul. 6, 2006 (DE) .................. 10 2006 031 799

(51) Int. Cl.
*H04N 13/04* (2006.01)
*G06K 9/00* (2006.01)
(52) U.S. Cl. .................. 348/42; 348/51; 382/103
(58) Field of Classification Search ............ 348/42–55; 382/103
See application file for complete search history.

(56) References Cited

U.S. PATENT DOCUMENTS

| | | | | |
|---|---|---|---|---|
| 5,808,792 A * | 9/1998 | Woodgate et al. | ........... | 359/463 |
| 5,959,664 A * | 9/1999 | Woodgate | ........... | 348/59 |
| 5,991,073 A * | 11/1999 | Woodgate et al. | ........... | 359/462 |
| 6,008,484 A * | 12/1999 | Woodgate et al. | ........... | 250/201.1 |
| 6,304,288 B1 * | 10/2001 | Hamagishi | ........... | 348/53 |
| 6,603,504 B1 * | 8/2003 | Son et al. | ........... | 348/54 |
| 6,727,866 B2 * | 4/2004 | Wang et al. | ........... | 345/7 |
| 6,791,570 B1 * | 9/2004 | Schwerdtner et al. | ........... | 345/613 |
| 6,801,243 B1 | 10/2004 | Van Berkel | ........... | 348/59 |
| 7,123,287 B2 * | 10/2006 | Surman | ........... | 348/51 |
| 7,445,549 B1 * | 11/2008 | Best | ........... | 463/32 |
| 7,492,513 B2 * | 2/2009 | Fridman et al. | ........... | 359/462 |
| 7,626,569 B2 * | 12/2009 | Lanier | ........... | 345/156 |
| 7,839,378 B2 * | 11/2010 | Krijn et al. | ........... | 345/102 |
| 2002/0180660 A1 * | 12/2002 | Wang et al. | ........... | 345/4 |

(Continued)

FOREIGN PATENT DOCUMENTS

| | | |
|---|---|---|
| EP | 0 833 182 A3 | 8/1998 |
| EP | 0 833 182 B1 | 6/2004 |
| WO | WO 98/27451 | 6/1998 |
| WO | WO 99/05559 | 2/1999 |
| WO | WO 01/18589 A1 | 3/2001 |

*Primary Examiner* — Haresh N Patel
(74) *Attorney, Agent, or Firm* — Brinks Hofer Gilson & Lione

(57) ABSTRACT

For continuous tracking without noticeable skips during physical changes in head position, the intensities of all subpixels of the matrix screen are reduced in order to form intensity focuses for subpixel groups behind barrier elements, which comprise a number n of subpixels, including a subpixel reserve, in the image lines. In the case of parallel alterations, these intensity focuses are then displaced by a constant absolute value continuously through directly adjacent subpixels and also through subpixel group boundaries with different stereo image views. Distance changes involve the intensity focuses being increasingly widened or compressed relative to the screen edges. The intensities of the individual subpixels can be altered by means of simple multiplication by standardized constant or variable intensity factors which can be ascertained as a function of motion.

10 Claims, 7 Drawing Sheets

U.S. PATENT DOCUMENTS

| | | | |
|---|---|---|---|
| 2003/0025995 A1* | 2/2003 | Redert et al. | 359/464 |
| 2003/0137730 A1* | 7/2003 | Fridman et al. | 359/462 |
| 2003/0151786 A1* | 8/2003 | Drinkwater | 359/15 |
| 2004/0184145 A1* | 9/2004 | Fridman et al. | 359/462 |
| 2005/0117016 A1* | 6/2005 | Surman | 348/51 |
| 2006/0001937 A1* | 1/2006 | Drinkwater | 359/200 |
| 2006/0028400 A1* | 2/2006 | Lapstun et al. | 345/8 |
| 2006/0170764 A1* | 8/2006 | Hentschke | 348/42 |
| 2006/0291052 A1* | 12/2006 | Lipton et al. | 359/463 |
| 2007/0222855 A1* | 9/2007 | Krijn et al. | 348/42 |
| 2008/0043094 A1* | 2/2008 | Ijzerman et al. | 348/43 |

* cited by examiner

METHOD FOR THE AUTOSTEREOSCOPIC PRESENTATION OF IMAGE INFORMATION WITH ADAPTATION TO SUIT CHANGES IN THE HEAD POSITION OF THE OBSERVER

CROSS-REFERENCE TO RELATED APPLICATIONS

This application is a continuation of application PCT/EP2007/004704 filed 26 May 2007, which in turn claims priority to application DE 10 2006 031 799.8 filed 6 Jul. 2006.

BACKGROUND

The present invention relates to a method for autostereoscopically presenting of image information on a matrix screen comprising a barrier raster with barrier elements arranged in parallel thereto, and n subpixels associated with the barrier raster and the barrier elements, the n subpixels being grouped in image lines as subpixel groups and being of variable intensity and including a subpixel reserve, a screened subpixel excerpt from a right and from a left stereo image view being shown thereon which is fed and correctly allocated to the right and to the left eye of the observer, whereby at least in the case of detected horizontal parallel alterations the image information is horizontally tracked to the head position of the observer in the image lines of the matrix screen relative to the matrix screen with regard to an initial position in the centre of the screen by proportionally shifting intensity focuses and by re-allocating image information to the subpixels becoming visible to the respective other eye.

In autostereoscopic presentation methods such as may be used in many different ways in information and communication technology, medical technology and computer and video technology in the public as well as in the private domain, the sumptuary process of eye-adapted stereo separation is performed during the method and within the framework of the implementing system; additional user hardware such as spectacles are not required, thus essentially increasing user comfort. The principle of autostereoscopic presentation methods is based on the screening of various image views on a screen and on an optical separation of these screened views towards the direction of the eyes of the observer, so that each eye only ever registers portions of one single image view in an optical context and combines these to form a perspective view. The separation raster further comprises many adjacent separation elements, such as dividers, slits, cylindrical lenses or prisms. Depending on the number of the illustrated discrete image views, a stereo view having a single perspective (two discrete image views which are usually absorbed at an eye distance) or a parallax view having a plurality of single perspectives (three or more discrete adjacent image view) are created. In commercially available flat screens (LCDs, plasma display, OLEDs etc.) each pixel consists of three subpixels in the colours red, green and blue, the intensity value of which is addressed in accordance with the presentation of the respective pixel.

PRIOR ART

In order to avoid scanning effects and in order to achieve a roughly symmetrical resolution in horizontal and vertical screen direction, the optical separation raster of matrix screens may be arranged in a swivelled manner and at an angle to the pixel raster (cf. e.g. the "slanted raster method" of WO 99/05559 A1). Apart from the significantly reduced single image resolution, a basic disadvantage of this approach, however, is the fact that single perspectives cannot be separated perfectly enough. This cross-talking of the adjacent stereo channels affects the spatial impression and reduces image quality e.g. due to blurring, multiple contours, contrast reduction and colour aberrations.

For this reason, DE 10 2004 059 729 proposes a method for generating screened subpixel excerpts using a slanted barrier raster by means of various multiplexing schemes, in which subpixel reserves are provided for each image view. Thereby, the subpixels are screened while maintaining the position assigned in the unscreened image view. As a result, calculation time and complexity for each subpixel excerpt may be significantly reduced. Furthermore, from the point of view of the context of the single perspective, each subpixel is correctly placed so that the screening required for autostereoscopy can guarantee an image reproduction which is true to the original. Each selected multiplexing scheme consists of the gradual line-by-line arrangement of two (or three) adjacent subpixels from the right image view directly and consistently beside two (or three) adjacent subpixels from the left image view. Between the individual image lines, a displacement of one subpixel is observed, thus generating a subpixel overlap between adjacent image lines of one (or two) subpixels for the same eye and reducing cross-talking between the two image views.

In order to achieve the best possible image quality comprising a high image resolution for the individual observer, autostereoscopic methods comprising two channels (screening of a left and of a right image view) have been described which adapt the zone of vision on the screen to the current position of the observer's eyes by means of mechanical and/or electronic means ("tracking method, cf. e.g. EP 0 354 851 A2). The eye or pupil position or another head or eye detail may be measured without contact and almost without delay by means of known video-technical methods. In these known two-channel methods, the given separation raster is arranged orthogonally to the pixel raster so that the resolution is reduced by half in the one (e.g. horizontal) direction while remaining unchanged in the other (accordingly vertical) direction. In order to reduce the demands on accurateness and response time of the tracking method for the eye position, it was proposed to implement additional pixel reserves in the left and right image columns of the respective screened stereo pair (cf. e.g. DE 197 36 035 A1). Although a certain tolerance with regard to head motions of the observer is thereby achieved, the disadvantage is that the already halved resolution in the one direction is even further reduced.

EP 0 836 332 B1 teaches a position-adaptive autostereoscopic monitor (PAM) comprising a vertical separation raster. An adaptation method for adapting the autostereoscopic image content to lateral observer motions with minor alterations regarding the angle of vision is described in which entire pixels to be presented are shifted subpixel-by-subpixel, whereby one or two blanked subpixels are used as shifting reserve. The method thus uses four or five horizontally adjoining subpixels for each pixel. By shifting entire pixels, however, the observer will clearly notice the image views switching over when carrying out lateral head motions. Moreover, the blanking even of visible subpixels reduces the brightness and the resolution of the image content. Apart from that, tracking of the image content is provided when the observer moves away from the screen by minimizing the screen by means of a projector shift on the screen. Apart from that, the insertion of fifth blanked subpixels is used for adapting to an observer located closer to the screen.

DE 198 27 590 C2 proposes an autostereoscopic method in which alterations in position are to be compensated by a redundant presentation of the image views. The object is to offer the correct and complete image information to each observer eye even if the position of vision is varied within certain limits without having to readjust the barrier raster. This method may also be used for slanted subpixels of a pixel; however, in this process the subpixels are addressed in time division.

The closest prior art for the present invention is disclosed by WO 98/27451 A1. A method for image tracking for exclusively horizontal parallel movements (relative to the matrix screen) of the observer is described. For this purpose, the intensity (brightness value) of the colour of a subpixel is conferred to the colour subpixel having the same colour and being located in the same image line at a distance of n colour pixels, each pixel comprising n subpixels. As a result, the known matrix screen always requires at least the subpixels occurring horizontally between two subpixels of the same colour in order to form the amount n for a pixel, since otherwise the colour information cannot be redistributed as brightness among the two homochromatic subpixels. As a continuing concept, a focusing method relating to individual subpixels is proposed by means of which very abrupt skipping is to be avoided by redistributing the intensity among subpixels having the same colour in intermediate stages. Said redistribution leads to undesired cross-talking in the respective adjacent channel. As a possibility to reduce said cross-talking, an extension of each pixel by a subpixel reserve of one subpixel (subpixel per pixel n+1) is proposed so that the two bordering positions of each pixel are always filled by subpixels of the same colour. Then the total intensity of the respective border subpixels is set in such a way that it corresponds to that of the colour excerpt (red, green or blue) of the pixel to be presented.

The above-described known method implies a certain tolerance with regard to distance changes of the observer. For example, at a distance from the matrix screen the observer can only perceive a percentage of the two bordering subpixels and thus of their intensity. Thus, the colour percentage of the two bordering subpixels combined is less than 100%. This could be compensated by altering the respective intensity value. However, it is explained that for standard configurations the width percentage of the bordering subpixels in the image section is only reduced by a few percent, so that the observer will see an image of approximately the same quality even without intensity compensation. This should also apply to larger distance alterations of the observer with regard to the screen. The described tolerance of the method with regard to a motion in a larger depth is thus obtained by means of shadowing effects. The discolouring of the visible pixels caused thereby is not so easily noticeable in the case of n subpixels and a reserve subpixel due to a counteracting discolouring of the adjacent pixels. However, a convergence error occurs in this context which is particularly noticeable at edges and in the case of abrupt colour transitions. Depth compensation is not an electronic tracking method for compensating changes in distance, but a method based on the possibility of widening the sweet spot by a theoretical ⅓.

OBJECT OF THE INVENTION

For the above-mentioned reasons, the object of the present invention is to provide a generic method of the aforesaid kind, guaranteeing a fluent continuous electronic tracking without noticeable switching effects for all head motions of the observer in parallel and at a distance to the matrix screen, having a constantly high imaging quality with regard to image resolution, channel cross-talk and other negative effects. Thereby, the method should be simple and operate in real time, it should be failure-resistant and implementation should be possible by commercially available means, i.e. in a cost-effective manner.

The solution for this object lies in a continuous tracking of the image information in the case of free physical motions of the observer for matrix displays equipped with barrier rasters in which n subpixels including a subpixel reserve (i.e. n, preferably 2 or 3 subpixels) in each image line belong to a view in horizontal direction and in which the pixels become visible for the observer from the overlap of subpixels or, as the case may be, even by means of vertically adjacent subpixels, the present invention forms tracking reserves. For this purpose, however, not only the subpixel reserves within a subpixel group (defined as those subpixels of a pixel that are directly adjacent in an image line) are used, but also adjacent subpixels from adjacent subpixel groups comprising different image information. In order to adjust these to the observer's angle of vision at its current view position, they are altered with regard to their intensity (brightness of the colour or grey value of the respective subpixel) in accordance with a focus method. Thereby, however, the focus method used does not relate to individual subpixels but to entire subpixel groups in the image lines. If an observer moves, these focuses of the subpixel groups in the image lines are shifted (parallel motion of the observer with regard to the matrix screen) or widened or compressed (if the distance between the observer and the matrix screen changes) together with other image information by an intensity redistribution of the subpixel, the intensity redistribution being adjusted to the kind and the magnitude of the changes of movement, to always directly adjacent subpixels—thus presenting other colour or grey values—in adjacent subpixel groups. The tracking of the image information, which has so far been typically implemented by altering the matrix screen (in particular the shifting of image information if the distance changes), is thereby replaced by a completely electronic tracking system in which the image content is analogously widened or compressed by simply multiplying the standardized intensity values of the subpixels by means of intensity factors depending on the change of motion of the observer in real time.

The present invention further provides that intensity focuses of the subpixel groups are at first formed by reducing the total intensity of the matrix screen to at least a value $(n-1)/n$ of the total intensity (n being the amount of subpixels including the subpixel reserve in a subpixel group). Said reduction of the total intensity which is less noticeable to the observer than e.g. the bisection of the resolution is required in order to admit an increase of intensity also for subpixels which have a maximum intensity (=1, to which the intensity factors may be scaled) in the initial position of the observer without image tracking. In other words, at first the intensity of all subpixels of the matrix screen has to be reduced so far that the total intensities of each subpixel group are reduced by at least the portion of the intensity of a subpixel.

Subsequently, these intensity focuses of the subpixel groups are continuously shifted or widened or compressed laterally in the image lines while maintaining the reduced total intensity in the subpixel groups in the image lines. In general, the magnitude of the shifting, the widening or the compressing depends upon the degree of the change of position. Furthermore, it depends upon the kind of change of position. In the case of parallel changes, horizontal or vertical, proportional intensity adaptations are always carried out. In the case of a barrier raster arranged behind the matrix screen relative to the observer, e.g. as an illuminated matrix in the shape of an illuminated strip raster, these adaptations are carried out in the same direction as the parallel movement and in the opposite direction in the case of the barrier raster being arranged in front of the matrix screen. In the case of distance changes, the intensity redistributions may be inversely proportional. This again depends on whether the barrier raster is arranged in front of or behind the matrix screen. If a change of distance in the head position of the observer relative to the matrix screen is detected, the intensity focuses are increasingly widened towards the edges of the matrix screen and compressed towards a distance in an inversely proportional manner if the barrier raster is arranged in front of the matrix screen and a proportional manner if the barrier raster is arranged behind the matrix screen. In all cases, the barrier raster may be configured as a strip, stepped or hole raster for separating the individual views.

When changing the intensity focuses of whole subpixel groups, it is essential according to the invention that the shifting, widening or compressing of the intensity focuses of the subpixel groups is always performed via directly adjacent subpixels in the image lines and, depending on the size of the parallel and distance changes, also across the boundaries between adjacent subpixel groups of the various stereo image views and that free subpixels become involved in the adjacent subpixel group of the respective other stereo image view.

The basic principle of the invention is thus based on the idea of at first creating a horizontal subpixel reserve in a barrier method comprising an alternate interleaving of left and right stereo image views in each subpixel group to be imaged. For this purpose, barrier methods are preferably used in which the subpixels alternate in the available primary colours in a vertically extended direction of the barrier elements and in which several subpixels belonging to the same view are provided in horizontal direction. Usually, this is the case for a vertical extension of the beam splitter in a tessellated arrangement of the subpixels and in a laterally tilted extension of the beam splitter in a tessellated arrangement of the subpixels. In order to create a tracking reserve, the intensity of all subpixels is reduced by a percentage corresponding to that of a subpixel within adjacent horizontally arranged subpixels belonging to the same stereo view. With n subpixels in a subpixel group, all subpixel intensities are also to be reduced by 1/n. The uniform distribution of the intensity factors caused thereby is used as an initial value for the tracking situation in the case of a nominal head distance and centered positioning if the barrier is aligned precisely, even if an equivalent intensity distribution which is symmetrical in the case of a lateral motion adjustment is provided in a laterally shifted manner. Based thereon, the intensity factors are altered depending upon the current head position, whereby the intensity focus of the subpixel group horizontally arranged behind the barrier opening is shifted relative to the barrier opening.

When using the term "subpixel group" within the context of the present invention, this refers to image elements that are at least horizontally adjacent and carry image information belonging to a view. Such image information may be pixel information or subpixel excerpts from pixel information. In the inventive method, no image contents are thereby shifted on to adjacent subpixels. Rather, the image information is obtained by forming correctly located, subpixel-accurate excerpts of the respective view. In this method, the address of each subpixel in the current subpixel excerpt corresponds to the subpixel address of the respective stereo image from which it stems. Colour information written to the matrix screen thus always correlates with the image address of the respective view which is then adjusted to the current head position of the observer merely by changing the intensity. As a result, only the intensity distribution is tracked in accordance with the eye position of the observer within a subpixel group. During this process, a lateral tracking and, within limits, a distance tracking even across the lateral boundaries of the individual subpixel groups is carried out by using adjacent subpixels that do not have an intensity (intensity factor zero) and have originally been used for the adjacent view and by occupying these with the image information of the respective view that corresponds to these addresses.

Tracking in the case of altered distances is carried out by utilizing subpixel reserves within the subpixel group and beyond it. The intensity change may thereby be achieved in a particularly easy manner by implementing individual intensity factors when addressing the individual subpixels. These individual intensity factors thereby also serve for increasing or reducing the intensities of the individual subpixels. For each change in the position of the observer, location-dependent intensity factors determined. All determined intensity factors for lateral and in-depth tracking of the observer motions may be superimposed by means of a weighting function in a subpixel-individual total intensity factor. The determining of the intensity factors and the influence on the intensity control of the subpixels is thereby carried out purely electronically in real time so that an image tracking without skips may be provided for head motions.

By means of the inventive method, parallel changes and distance changes of the observer relative to the matrix screen may be compensated without skips. In the case of a barrier raster having vertical barriers which are arranged in parallel to the image columns and to the horizontally adjacent subpixels between which the intensity focuses are displaced, a vertical change of the head position relative to the centered head position does not require compensation since the observer does not notice any other image views beyond the horizontal barriers. In a barrier raster which is slanted with regard to the image lines, the slanted barriers require a compensation even in the case of a vertical change of the head position, as the respective adjacent image views can be viewed. The same holds true for slanted subpixels within a pixel (cf. below). As a result, it is advantageous for the inventive method if an intensity factor is determined even for vertical changes in the head position in the case of parallel changes in front of a slanted barrier raster or slanted subpixels within in pixel, whereby the determined intensity factor can be superimposed over the other intensity factors. For barrier rasters having a slanted position relative to the matrix screen, or for slanted subpixel arrangements, it is thus provided by the inventive method to translate upwards and downwards deviations from the observer position into a ascent-dependent lateral shifting of the intensity focuses.

By means of the inventive method, any desired changes of the head position may be compensated by means of the superimposition of the intensity adjustments of the subpixels resulting from the change in distance as well as from the horizontal or vertical changes of the head position for altering the intensity focuses of the subpixel groups. The inventive method provides a natural view to the observer without motional limitations and thus with a high comfort. In particular, the inventive method for the first time provides a tracking of vertical changes in the head position which would have to be compensated in the case of slanted barrier rasters. However, it is also possible to only specifically compensate individual changes of position. In the case of a superimposed threefold or twofold compensation, the respective detected and signed intensity factors are added. In the case of a simple compensation, they will accordingly be considered individually.

The adjustment of the intensities of the subpixels to the current head position of the observer by means of multiplying with the detected intensity factor results in an increase (intensity factor more than 1) or in a decrease (intensity factor less than 1) of the current intensity of each subpixel. However, if the respective subpixel already comprises a maximum intensity, no further increase can be carried out. Thus, it makes sense to reduce the colour intensities of all subpixels prior to determining the intensity focuses by a constant factor at first in order to generate a brightness reserve. If the corresponding subpixel already has a minimum intensity, it is black and may no longer be subjected to a further reduction, but only to brightening. Particularly, subpixel reserves provided within a subpixel group which are at first black, as no image content has been assigned to them in the subpixel excerpt, are utilized for being brightened within the framework of relocating the intensity focuses in the colour value assigned to them (polychromatic, monochromatic). Thereby, a brightness reserve is not appropriate and would lead to a corruption of the left and right stereo image views. Furthermore, the detected intensity factors may advantageously be scaled to a central distance of the observer's head position relative to the matrix screen. Further embodiments with regard to this can be found in the descriptive part of the present invention.

Summing up, the method of the present invention can be divided up into several sections:

Initialization and Alignment

Generally, a reduction of the total intensity of the matrix screen to at least a value (n−1)/n of the total intensity (n being the amount of subpixels within a subpixel group including the subpixel reserve) is at first carried out. In other words, the intensity of all subpixels of the matrix screen is so far reduced that the total intensity of each subpixel group is decreased by at least the part of the subpixel intensity. For a preferred embodiment of the inventive method, the intensity of all subpixels of the screened image views is decreased to $\leq 50\%$ prior to factorization in order to form a brightness reserve. This is e.g. achieved by reducing the bit number of each addressable subpixel e.g. by a bit or by blanking one subpixel in each subpixel group. The latter is the preferred option, as it is simple and may be realized with a smaller amount of method steps. The reduction of the number of representable colours is typically compensated by the redundancy connected to the arrangement of the subpixels.

A decrease of intensity for forming a brightness reserve is required in order to be able to relocate the intensity focuses of a subpixel group for image tracking with regard to changed head positions of the observer. Thereby, an intensity of the subpixels scaled to a maximum intensity may be defined for an initial observer position, i.e. central in front of the matrix screen and/or the barrier raster for a nominal distance of the observer, e.g. comprising an intensity factor $I_n \leq 0.5$ for left and right image strips having a width of two subpixels each. When contemplating the horizontal distribution of the intensity, the sum of the intensity factors $I_n$ of an image view assigned to a barrier opening amounts to a scaled value of $I_{ges}=1$. Accordingly, the ratio of the intensities of two directly adjacent subpixels is 0.5:0.5 (for three adjacent subpixels per image view it would be 0.25:1.0:0.25).

In order to better utilize the total brightness of the matrix screen, an alternative embodiment of the inventive method, in which three subpixels are arranged horizontally in a line behind the barrier opening, may be modified in such a way that the intensity factors $I_n$ are distributed with a ratio of 0.5:1.0:0.5 in the central perspective. In this case, the result is a reduction of the total brightness to two third of the original brightness.

Since the progress of the intensity factors $I_n$ is symmetrical from various positions of the matrix screen, the initial position may also be determined if the intensity factors $I_n$ are differently distributed. This results from the intensity distribution of 1.0:0.0 and/or 1.0:1.0:0.0. In these cases, the position of the observer is located in the centre of the intensity curve.

Factorization by Means of Tracking and Determination of the Intensity Focuses of the Subpixel Groups If the observer changes his/her position, the intensity of each subpixel is multiplied with an intensity factor $0 \leq I_n \leq 1$, whereby the sum of the intensity factors of the subpixels within a subpixel group is constant and its individual values are horizontally distributed in such a way that a relocation of the intensity focuses compensation the motions of the observer is provided.

When Tracking Parallel Alterations

The inventive method provides that in the case of a parallel alteration (horizontal head motions and additionally vertical head motions in the case of a slanted barrier raster or subpixels arranged in a slanted manner within the pixel) of the head position, all intensities of the subpixels within a subpixel group are redistributed around a constant intensity value by multiplying with the intensity factors $I_n$. If e.g. the parallel change of the head position in an arrangement comprising an image strip width of two subpixels corresponds e.g. to the relocation of one subpixel to the left by 20%, 20% of the total intensity within the subpixel group are redistributed, resulting in a ratio of the intensity factors of 0.4:0.6. This means that to the degree to which the one subpixel is subjected to a brightening, the directly adjacent subpixel is darkened. The total intensity within the subpixel group in which $I_{ges}=1$ is thereby maintained, a lateral relocation of the intensity focus of the subpixel group in proportion to the head motion takes place.

The shifting of the intensity focus of the subpixel group is carried out in contra-sense to the head motion of the observer looking at the matrix screen through stationary barrier openings. The respective pixel located on the boundary of the image strip in the direction of movement is then multiplied with an intensity factor $I_n$ reduced in proportion to the distance covered. Accordingly, to the opposite outer subpixel is multiplied with an intensity factor which is increased in proportion to the distance covered. The totals formula for a compensation of positional changes in all three Cartesian spatial directions $$I_{ind\_1}=I_x+I_y+I_{ind\_z}$$

in which $$I_{ind\_1}+I_{ind\_2}=\text{konst}=I_{ges}$$

then results in the intensity focus of a subpixel group (n=2) having a width of two subpixels according to:

$$IS=\text{Abs}(I_{ind\_1}-I_{ind\_2})/\Sigma I_n.$$

If for example a subpixel on the boundary of a subpixel group of the right-hand view has already reached the maximum intensity factor, the subpixel from the subpixel group for the left-hand view which has now been multiplied with the intensity factor 0 is used in order to relocate the intensity focus in the case of even stronger observer motions, in order to present contents of the right view charged with intensity factors. As a result, the originally used other boundary subpixel is released for the other adjacent subpixel group of the left view. In this manner, the image content is tracked via the subpixel group. The image information of the newly used subpixel is thereby preferably taken from another suitable subpixel excerpt. A possibility of modifying the method is provided by the shifting of information from the abandoned subpixel of the subpixel group into the newly obtained subpixel. Gaps opening up between the subpixel groups are not charged with image contents.

When Tracking Distance Changes

Moreover, the inventive method allows for an electronically smooth tracking of distance changes of the observer with regard to the screen. If the observer comes closer to a matrix screen having an upstream barrier raster, the image content must be subjected to a widening increasing towards the screen edges, since the observer's view into the lateral barriers becomes increasingly slanted and the angles of vision become more flat. If the observer increases his/her distance to the screen, his/her angle of vision into the lateral barriers becomes increasingly steep and the image content must be increasingly compressed towards the screen edges.

In electronic distance tracking, the widening and compressing of image information by means of a relocation of the intensity focuses of the subpixel groups increasing towards the screen edges is achieved. For this purpose, it is provided that for each distance change of the head position the intensity value of each subpixel is multiplied with an individual factor depending on the distance (weighting function). By means of this process, the intensity focus within each subpixel group may be laterally relocated in the individual case. The weighting function is set in such a way that all focuses have the same lateral distance to each other and are thus equidistant. By varying this distance, the stereo zones of the observer position may be adapted. The distance of the intensity focuses s thereby depends upon the distance L of the barrier elements (pitch) from the observer distance z to the matrix screen, and upon the distance a between the matrix screen and the barrier elements. This results in $$s = \frac{1}{2}L(1 - a/z).$$

Furthermore, the method of the invention may preferably also be used for a time-sequential presentation of image views, particularly when using a switchable barrier raster in which the positions of the barrier elements between the subpixel addressings may be shifted by an absolute value essentially derived from the subpixel screening. In order to realize this modified method it is e.g. advantageous to combine a matrix screen with an increased image frequency (e.g. 120 Hz or faster) and a rapidly switchable barrier raster, as the observer will then perceive stereoscopic views of the left and right image view in full native and jitter-free resolution of the matrix screen.

The method according to the invention may be carried out with various subpixel formations and configurations. Screens may be used in which the subpixels of one colour are grouped vertically (matrix arrangement) or slanted with a displacement of one subpixel across the image lines (tessellated arrangement) to form pixels. In the case of a slanted grouping of the subpixels of one colour, e.g. with a displacement of one subpixel per image line, vertical as well as slant configurations of the barrier raster may be operated by means of the inventive method. In the case of a vertical grouping of the subpixels of one colour, the method is utilized when the barrier raster is inclined with regard to the pixel columns having a skew of one subpixel with regard to the image columns (slanted raster). In this arrangement, the subpixels located in the direction of the barrier opening alternate between the colours red, green and blue. In this context, it was already stated in the prior art section (cf. DE 10 2004 059 729 B3, the disclosure of which is herewith incorporated into the present invention by mention) that the use of slanted barrier rasters is advantageous as in particular a symmetrical stereoscopic resolution is achieved on the matrix screen. Moreover, it is known that the cross-talking between the individual image channels may be reduced if subpixel reserves are implemented between the channels. It is therefore also of advantage for the inventive method if for the use of a slanted barrier raster in which the barrier elements have a skew corresponding to the small lateral ratio of the subpixels and in which the barrier elements are inclined towards the matrix screen, the subpixels of the colours red, green and blue and the subpixel reserve for a pixel exhibit a line-by-line displacement of a subpixel in the skew direction of the optical barrier raster with regard to each other. Thus, various possibilities exist for presenting a pixel by means of subpixels.

Usually, the pixels are composed of subpixels of the differing colours red, green and blue. However, all subpixels may comprise analogous colour properties, e.g. if the matrix screen, as in the case of a monochromatic matrix screen, does not comprise colour filters so that the subpixels grouped to form a pixel comprise monochromatic colour intensities and are monochrome, particularly grey or black/white. In these cases the inventive method is used as well, in which the charging with intensity factors is carried out in the same way as in the case of polychromatic subpixels. The same also holds true for screens having colour-sequential presentation or colour-additive image rendition (stacked display) in which the pixel acquires a mixed colour. In this case, the method described for subpixels is used for pixels.

Moreover, by means of the inventive method screened subpixel excerpts may be generated according to multiplex schemes adapted to the current head position, whereby only such multiplex schemes are used for continuous formation of subpixel excerpts which do not access subpixels with the same location from the left and right image view and thus have no redundancy with regard to each other. Thereby, the memory space needed by the method for forming subpixel excerpts is reduced when compared to the prior art. Further embodiments for utilizing special multiplexing schemes for a slanted barrier raster may again be taken from the above-mentioned DE 10 2004 059 729. In contrast to the method presented therein, the method claimed by the present invention exhibits the significant advantage that only half (in the case of one subpixel reserve) or even only a third (in the case of two subpixel reserves) of the memory space is required for the screened image views since only those multiplexing schemes are used that do not access identical subpixels, but follow seamlessly.

An essential feature of the inventive method is the electronic tracking of the current autostereoscopic image information to the current position of the observer's eyes. Advantageously, the determination of the current eye position may be carried out by taking into account a preferably video-based detection method for detecting head or eye details of the observer. Such detection methods are commonly known and reliably developed. They may operate without any further inconvenience for the observer, such as markings on the observer's head, and thus do not affect user comfort, but rather increase it since due to the electronic tracking of the inventive method, head motions of the observer are admitted without the observer leaving the stereo zone of an image perspective in the process. Video-based tracking methods operate on the basis of video cameras for recording the current head or eye details, which are evaluated accordingly.

Other detection methods without video recording of the observer are also fully developed and ready for use.

An advantageous feature of the tracking method is a dynamic alteration of the recording settings for the image views depending on the current eye position determined by the tracking method. Apart from the autostereoscopic presentation of stationary image scenes, this is also possible for the presentation of autostereoscopic moving images. Thereby, a dynamic filing of the image view is advantageous. In this context, standard video formats may be used and evaluated for addressing the subpixels. Furthermore, an automatic adjustment of the resolution of image views to the resolution of the matrix screen may be advantageous (format conversion), as e.g. integrated in the software for conventional computer operating systems. In the inventive method, an allocation of the detected eye or head position to the image-generating unit may be provided.

The inventive method can be carried out in an arrangement as known from DE 10 2004 059 729. In particular, a right memory and a left memory as well as a multiplex memory for storing the currently generated subpixel excerpt, a processing unit for forming the current subpixel excerpt as well as for controlling the procedure and the individual arrangement components, and at least one tracking system for locating head or eye details of the observer, which is preferably video-based, may be provided. The intensities are usually adjusted within the graphic card. The relocation of this function into the display is also possible, however, it requires the corresponding electronics to be integrated into the display. In order to compensate a reduction of the colour depth which may occur during the digital addressing of the subpixels of the display, the image may be dittered with regard to time and/or location.

BRIEF DESCRIPTION OF THE DRAWINGS

For a clearer understanding, the present invention will now be explained in more detail in conjunction with the accompanying schematic drawings, in which.

DESCRIPTION OF WORKING EXAMPLES

Figure 1:
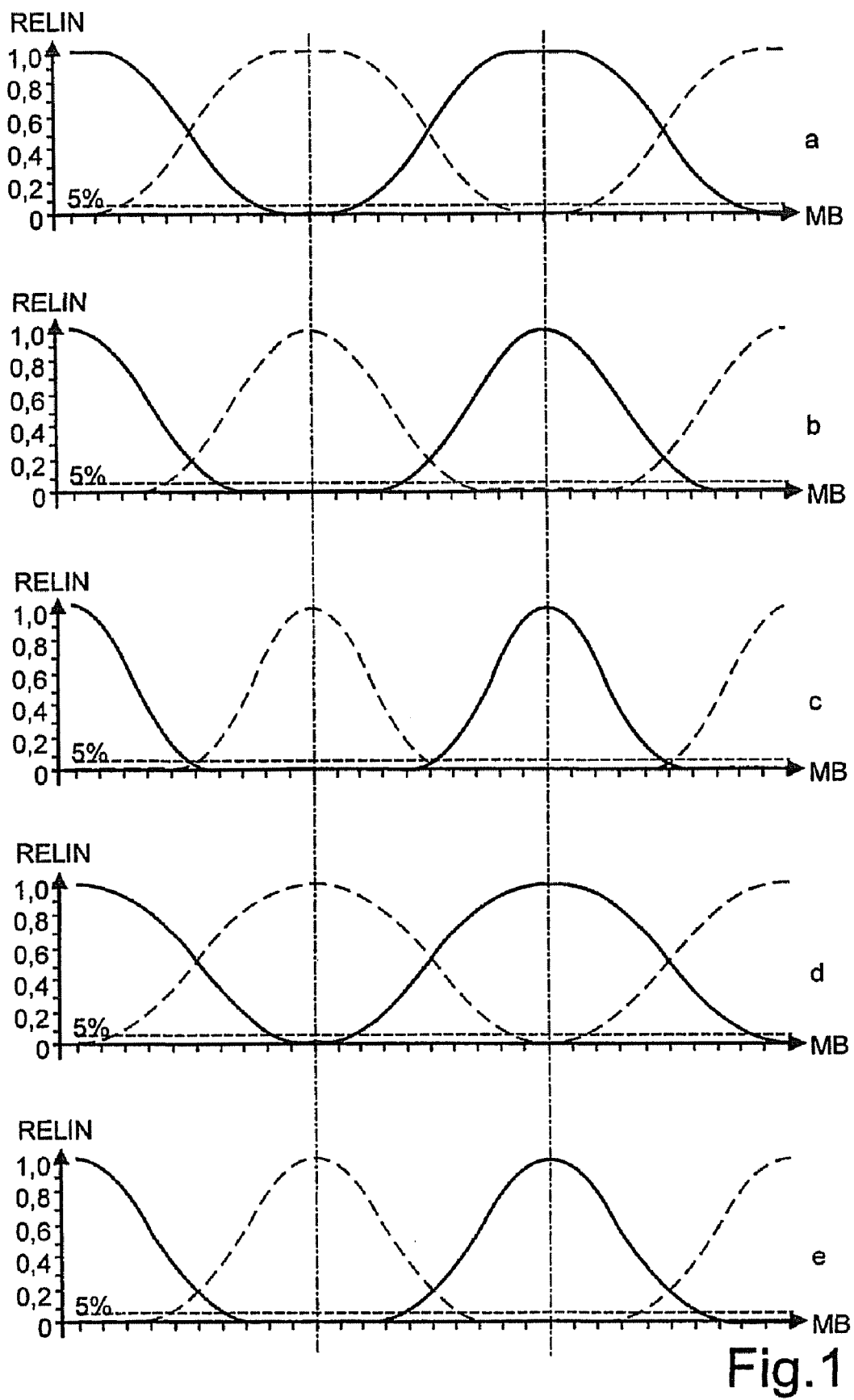
FIG. 1 illustrates stereo-channel widths having a slanted strip raster.

FIG. 1 illustrates the stereo-channel widths (relative intensity RELIN across the width of the matrix screen MB) at a slanted barrier raster having a varying number of subpixels and a varying number of activated subpixels within a subpixel group. In a, b and c, the subpixel group has a width of n=3 subpixels. In a, all 3 subpixels are active, in b only 2 are active, and in c only 1 subpixel is active. In d and e, the subpixel group has a width of n=2 subpixels. In a, both subpixels and in e only 1 subpixel is active. The decreasing channel width is clearly visible. The channels have an eye distance P to each other. The bold curve indicates the intensity of the user signal, the thin curve depicts the intensity of cross-talking at the respective location of the observer. The intersections with the 5% line characterize the useable channel width.

Figure 2:
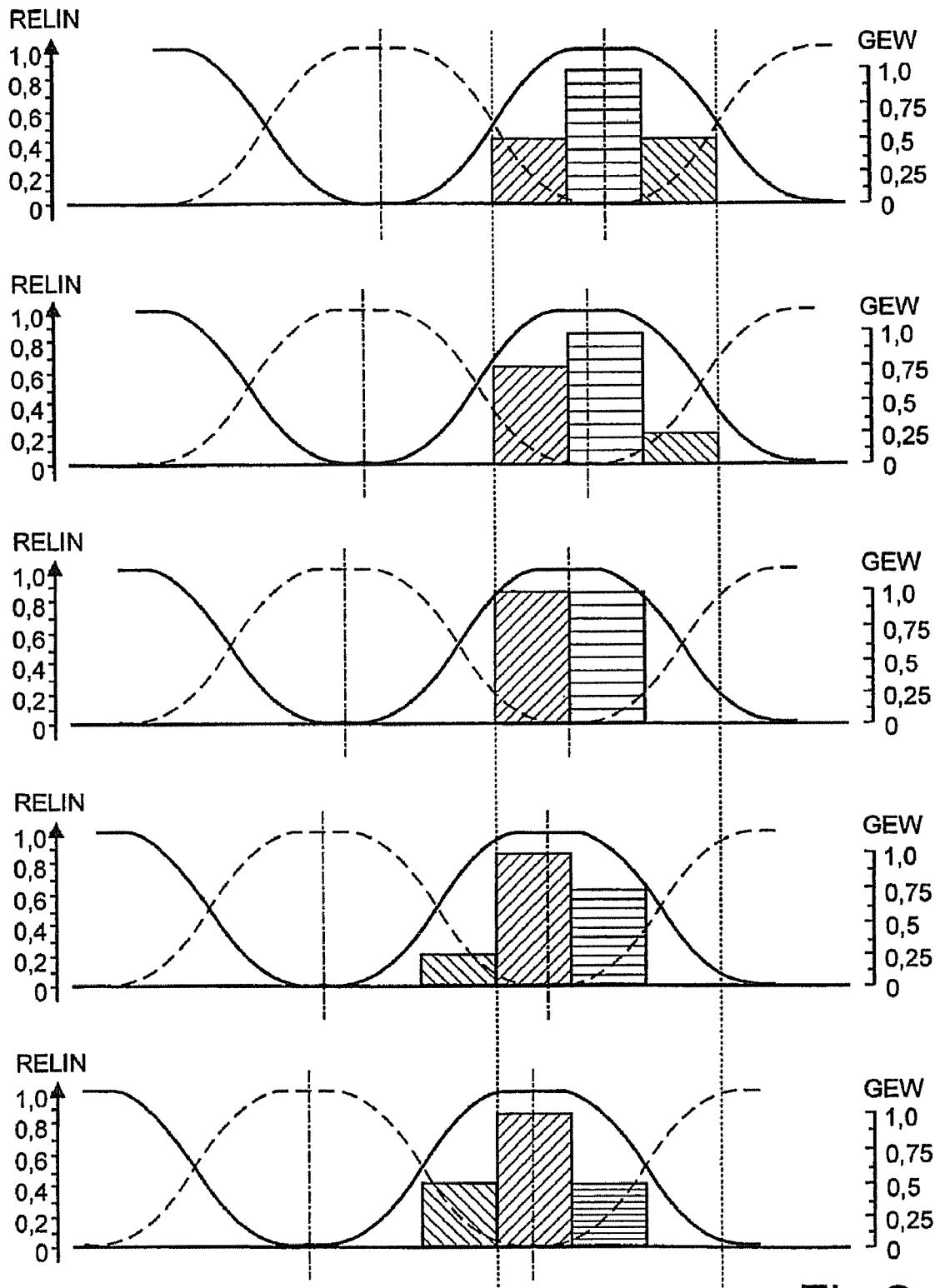
FIG. 2 illustrates the progress of the intensities in the stereo-channels at a diagonally ascending barrier raster comprising a redistribution of intensity within a subpixel group and beyond its boundaries in the case of parallel changes of the head position.

FIG. 2 illustrates the progress of the intensities in the stereo-channels according to FIG. 1 for the case of three illuminated subpixels in a subpixel group consisting of 3 subpixels. Two or three subpixels are located between the maxima of the left and the right stereo-channel. Respectively, the maxima of the stereo-channels may be achieved only in rough stages by redistributing whole subpixels, whereby positions with increased cross-talking occur. This is particularly the case if the detection accuracy is low and/or a noticeable time delay exists between location and image tracking.

Moreover, FIG. 2 illustrates the stereo-channels and the area distribution of the intensity factors with which the subpixels belonging to the view and being arranged in groups of three are charged. The individual diagrams clarify the effect of the redistribution of the intensity factors to the position of the stereo-channels. The relocation of the brightness focuses by redistributing brightness by means of intensity factors in the case of lateral tracking is depicted. The weighting function GEW resulting from the individual intensity factors depending on the degree of positional change of the observer is plotted on the right axis of ordinates. Thereby, the redistribution within the intensity factors is the same for all subpixel groups of the matrix display. In several redistribution steps it is shown how the lateral shifting of the intensity of the subpixels is realized even across the original boundaries of the subpixel group.

Figure 3:
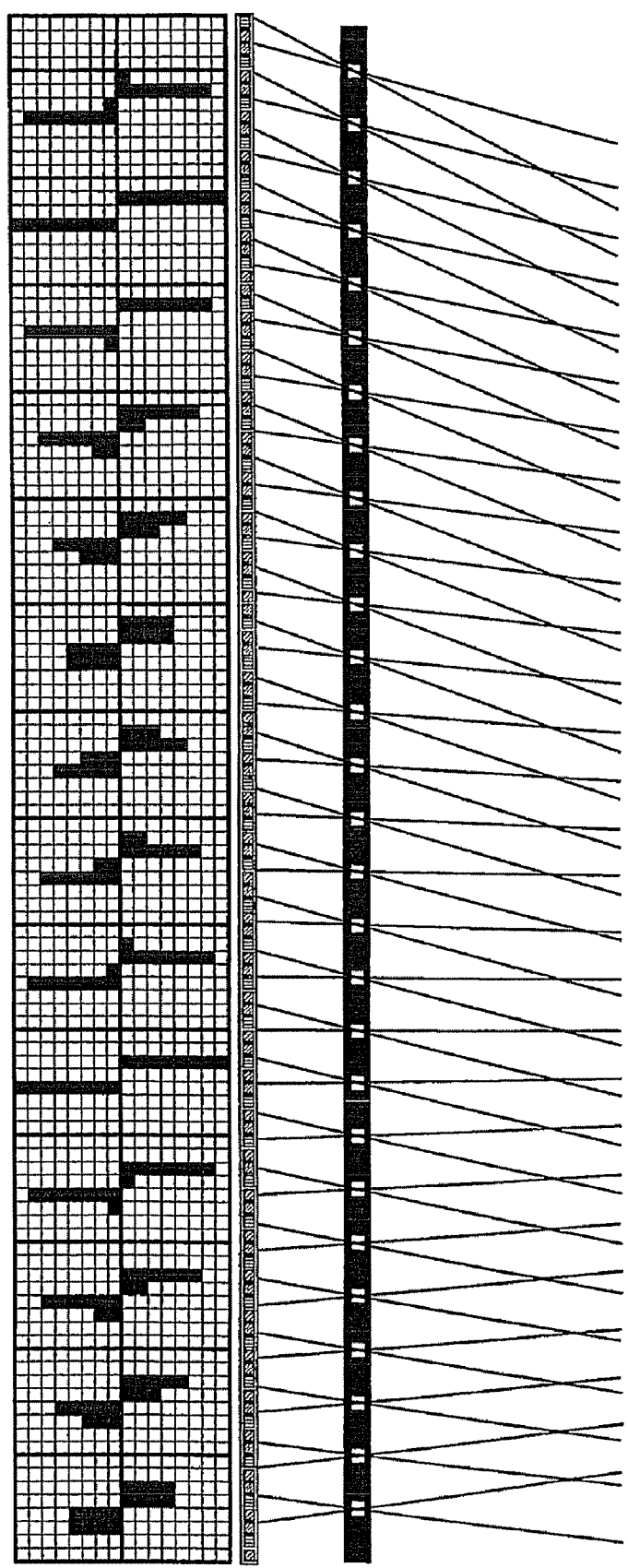
FIG. 3 illustrates an intensity diagram for a distance change.

FIG. 3 depicts an intensity distribution diagram for a head position approximating the matrix screen in contrast to the initial position. For clarity reasons, no subpixels have been depicted in every second provided space for a subpixel pair. A subpixel pair (right and left subpixel) in the center of the matrix screen, then a bit of space (subpixel pair not depicted), then a subpixel pair with an intensity slightly shifted to the right-left intensity factor lower than right intensity factor (the intensity (=1) of the respective subpixel scaled to the maximum value is multiplied with these intensity factors in the case of a distance change). The process continues until one subpixel has been multiplied with an intensity factor 0 (0%) and one subpixel has been multiplied with an intensity factor 1 (100%), respectively. The subpixel multiplied with the intensity factor 0 becomes free by multiplying the right abutting subpixel of the next subpixel pair with the now increasing intensity factor. By means of this intensity relocation, the focuses of the subpixel pairs are shifted from the center to the outside. Thereby, the image information is widened. This widening takes place when the observer comes closer to the matrix display during electronic tracking. A neuralgic spot is reached if the 100% mark (value 1) of the intensity factor is achieved as the subpixel reserve within a subpixel group is then exhausted. However, the widening of the intensity focuses of the subpixel groups may be continued as a whole subpixel from the adjacent subpixel group is again released as a new subpixel reserve. This can be seen from the fact that in the case of an intensity factor 1 (100%) a distance comprising 7 instead of 6 subpixels is free between adjacent subpixels. This can easily be seen from the vertical lines in the grid.

Below the intensity distribution diagram, the assignment of the individual subpixels to the colours red, blue and green and the barrier raster with the individual barrier elements are depicted. The lines show the observer's direction of view into the right half of the matrix screen and through the barrier elements.

The electronic tracking in the case of parallel changes of the head position with regard to the matrix screen is noticeably simpler: all relocation of intensity focuses of the subpixel groups to the left or to the right are in contra-sense to the direction of the observer's motions (in the case of a barrier raster which is arranged upstream with regard to the observer) and equal in shares (multiplying with constant intensity factors via all subpixel pairs).

Figure 4:
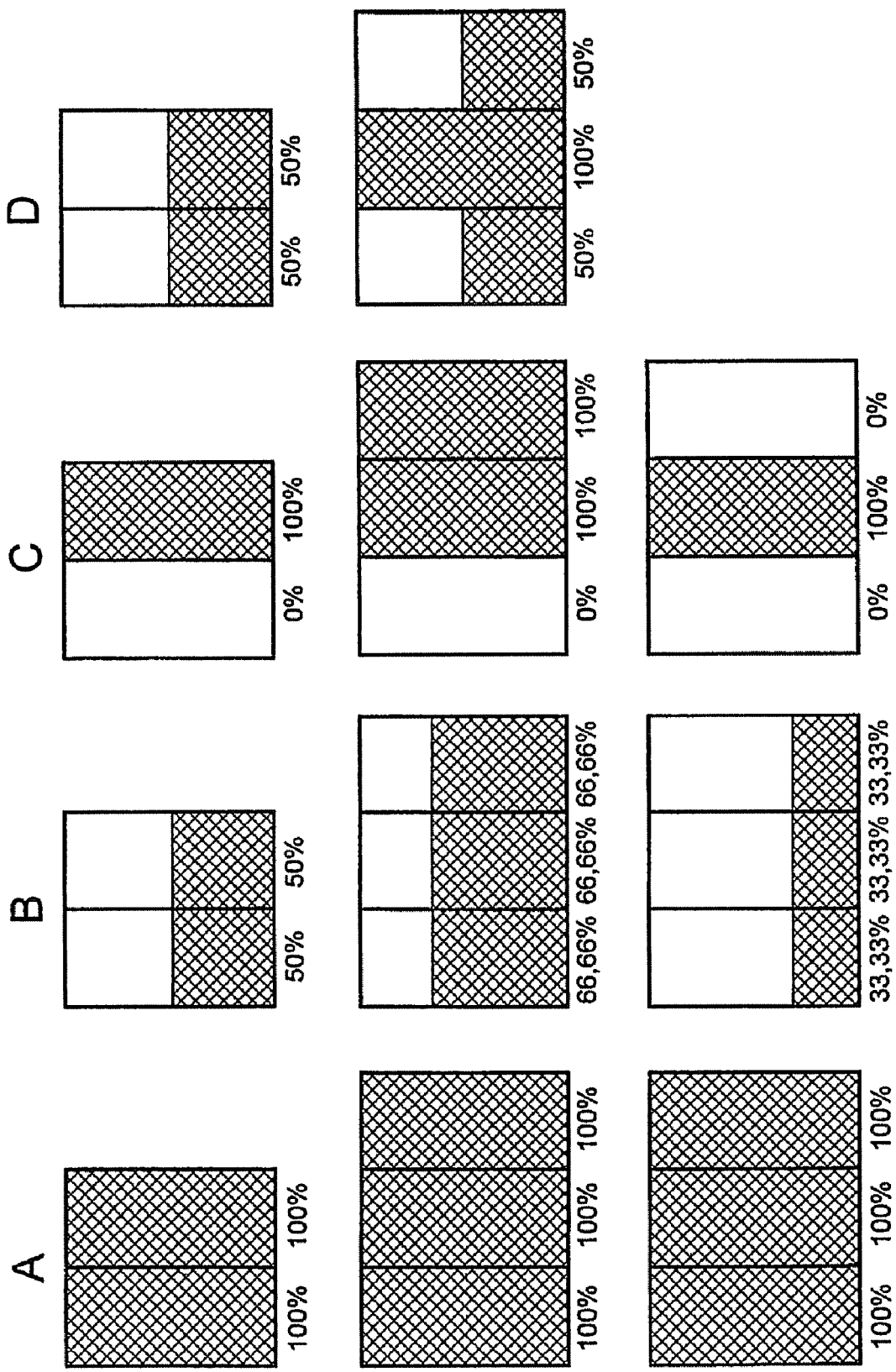
FIG. 4 illustrates examples for a redistribution of the total intensity in subpixel groups.

FIG. 4 illustrates examples for reducing the brightness of the subpixels of a subpixel group horizontally belonging to a view, shown as the nominal distribution of intensity over the area of the subpixels of a subpixel group. It shows the intensity distribution within the area represented by the subpixel group after intensity adjustment. Column A shows the original intensity, column B shows the targeted intensity level. The two columns on the right show the achieving of the targeted intensity level by means of method 1 (C) and by means of method (D) (for the methods, cf. below).

Figure 5:
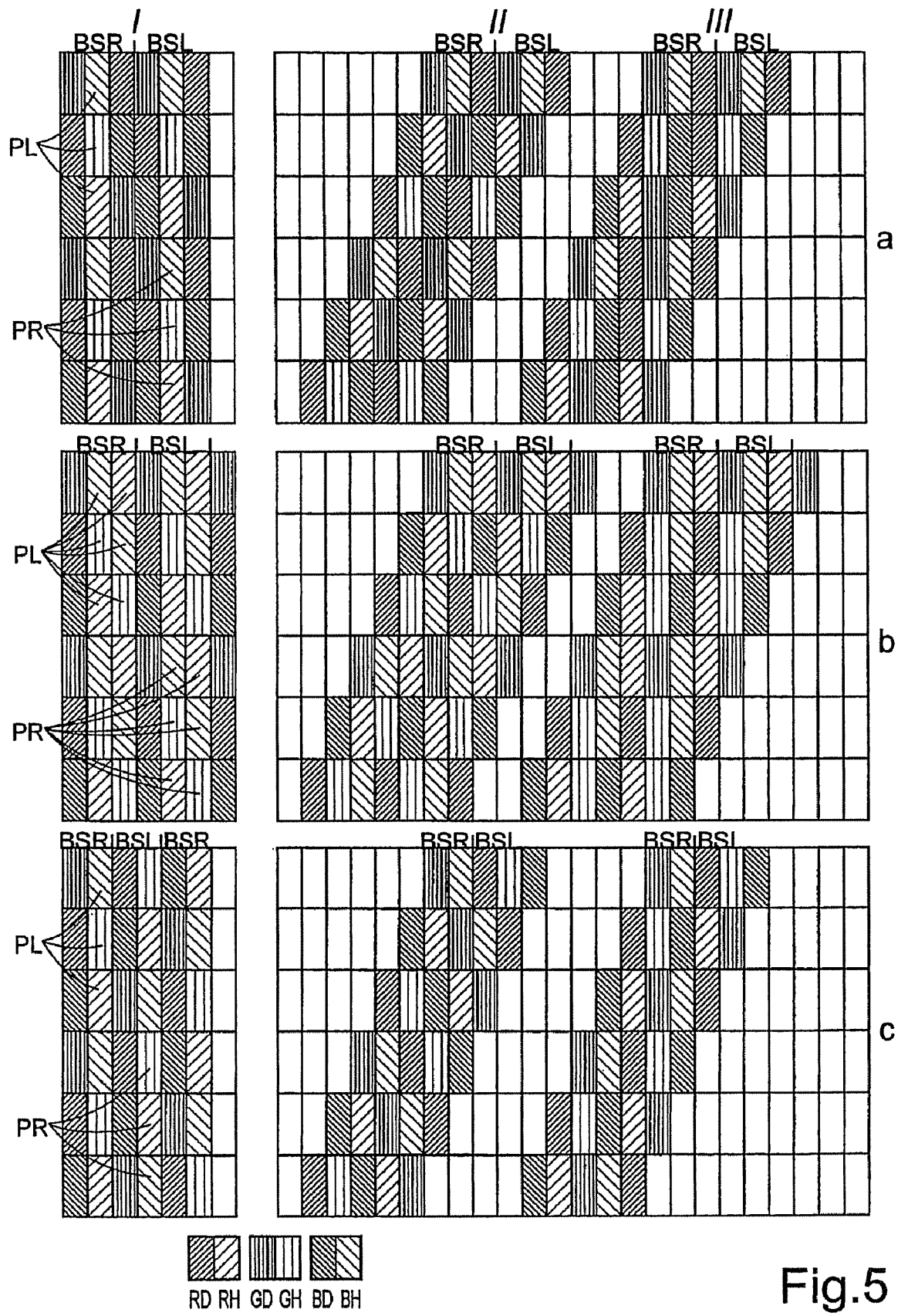
FIG. 5 illustrates examples for the formation of a new pixel.

FIG. 5 illustrates examples for the formation of pixels by means of combined subpixel excerpts. It is shown how the information of the subpixels from different subpixel groups re-combine to form pixels when the colours of the subpixels alternate alongside the barrier elements. Horizontally adjacent illuminated subpixels are then not perceived as separate colour dots, but as their overlap. The resulting horizontal pixel size is determined by the barrier opening.

This means R: red, G: green, B: blue, H: bright, D: dark. Column I shows a vertical tessellated pattern, column II shows a slanted tessellated pattern, and column III shows an RGB matrix pattern. The Figure shows the image columns from the right view BSR and from the left view BSL. The image section a shows an arrangement of 3 subpixels per view whereby 1 subpixel is illuminated. Pixels PR belonging to the right view and pixels PL belonging to the left view are formed. The image section b shows three subpixels per view with two illuminated subpixels each. The image section c shows an arrangement of two subpixels per image view with one illuminated subpixel each.

Figure 6:
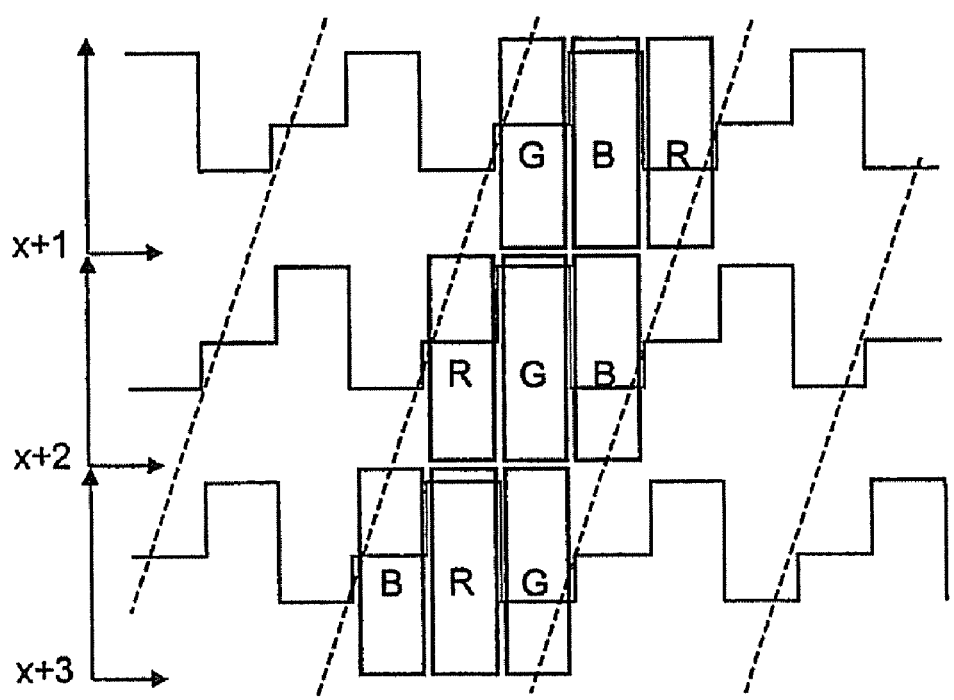
FIG. 6 illustrates a section from the pixel field of a panel indicating the progress of the subpixel intensities.

In FIG. 6, a section from the pixel field of a panel is shown. The brightness of each pixel is multiplied with an intensity factor. The entirety of the intensity factors across a pixel line may be described in a periodic function. The period length corresponds to a pixel group width. The function is the same for each pixel line X, but laterally displaced from line to line (X+1, X+2, X+3) by a subpixel width. The intensity factors of the consecutive subpixels are identical in the column direction, and different in the line direction. In total, a colour balance is generated across the depicted 3 subpixel groups. By means of the weighting function, the focus for the brightness of the slanted image columns may be laterally displaced.

Figure 7:
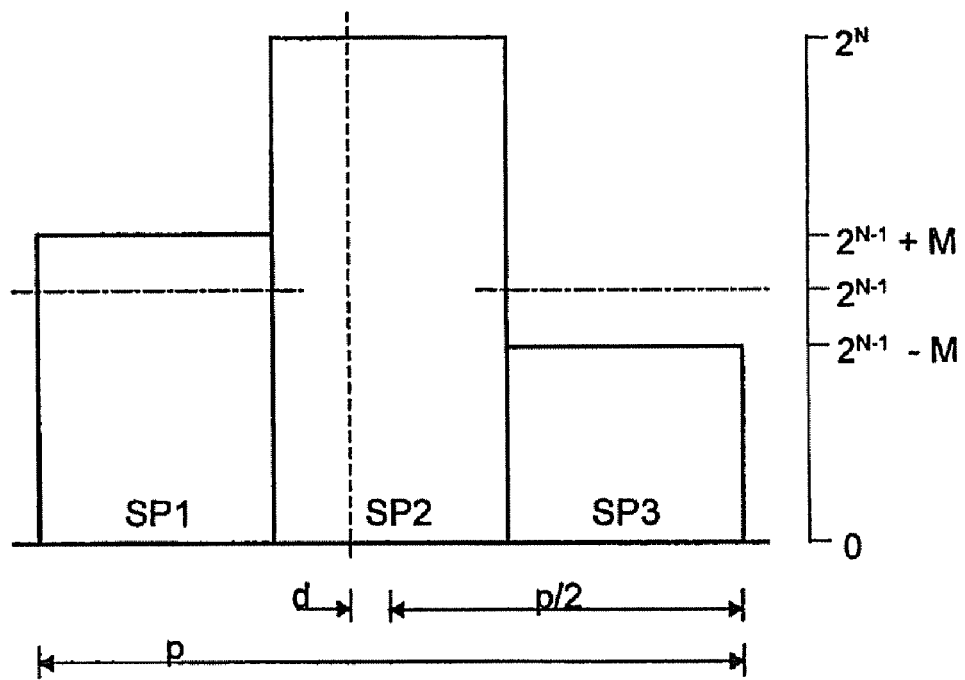
FIG. 7 illustrates ratios of weighted subpixels of a subpixel group.

FIG. 7 illustrates the progress of the weighting function for a period length. In order to shift the area focus, the height of the three stages is altered in 2N discrete steps. The total area of the function is thereby to remain equal so as not to change the brightness of the pixel. In order to be able to maximally shift the focus, the total area below the stepped curve is selected as two thirds of the largest possible area. By rearranging the area, the focus may be shifted by ±p/6, p corresponding to the width of the subpixel group (consisting of three colour subpixels SP1, SP2, SP3). The relocation of the weighting parts may be carried out in different ways, as is shown by the following method parameters. The initial situation in each case is a symmetrical progress of the function for the 3 subpixel groups, the focus being located in the centre of subpixel group 2.

Process 1:

Initial situation: $2^{N-1}$ stages are arranged over subpixel groups 1 and 3, and $2^N$ stages are arranged over subpixel group 2. In order to relocate the intensity focus, parts of colour subpixel 3 are transferred to colour subpixel 1 and vice versa. FIG. 5 shows how M parts of colour subpixel 3 has been transferred to colour subpixel 1. The focus migrates from the centre in the direction of colour subpixel 1 covering the distance $$\delta_1 = \frac{1}{3} M \cdot p \cdot 2^{-N},$$

M being: $0 \leq M \leq 2^{N-1}$.

Process 2:

Initial situation: $2^N/3$ stages are arranged over the colour subpixels 1, 2 and 3. In order to relocate the focus, weighting parts are transferred from the one outer colour pixel to the other outer colour pixel with the centre colour pixel 2 as an intermediate station. A part of the subpixels 1 is at first also transferred to the subpixel 2, and in the next step to subpixel 3. In each step, the focus then only migrates by half of the absolute value $$\delta_2 = \frac{1}{3} M \cdot p \cdot 2^{-(N+1)},$$

as in process 1, M being: $0 \leq M \leq 2^{N-1}$.

A shift of the focus having more detailed stages may be achieved if the rearrangement of the weighting parts is not carried out for all subpixel groups in the lines of a pixel panel, but is e.g. distributed over 3 respective lines. In such a way, as is shown in FIG. 6, e.g. in line X+1 in every third image strip a part of colour pixel 3 may be relocated to colour pixel 2 (process 2). In the lines X+2 and X+3, the same procedure takes place, however, displaced by one image column, respectively. Effectively, the focus of the image strip is only reduced by $\frac{1}{3} \delta_2$.

Figure 8:
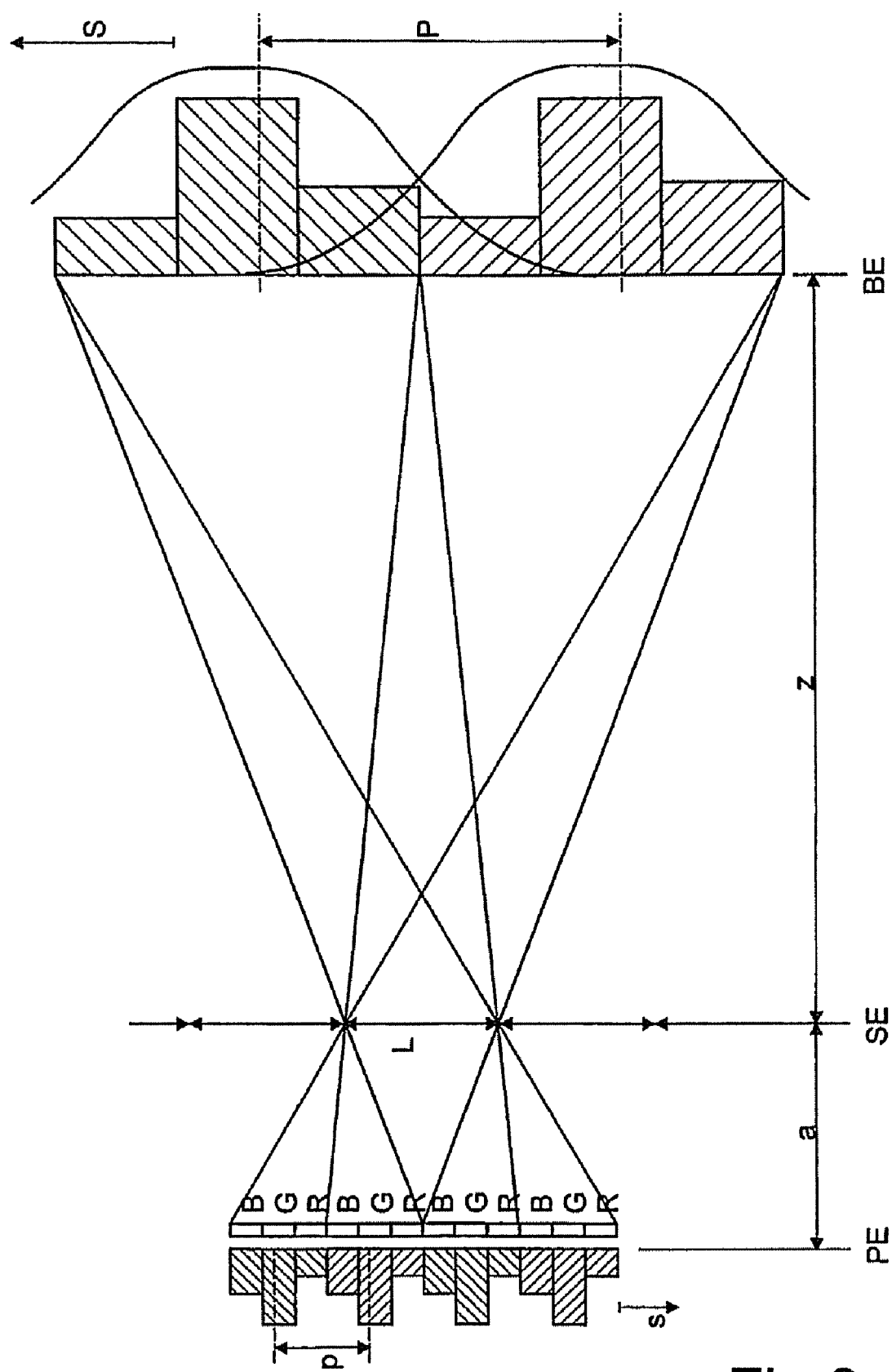
FIG. 8 illustrates ratios in a section of the sectional view caused by the course of the imaging beam on a matrix display having an upstream barrier.

FIG. 8 shows the relationship in the course of beam between the matrix screen (pixel level PE) and/or the barrier raster (slot level SE) and the observer (observer level BE) in a horizontal sectional plane level with the observer's eyes. The relocation of the focus of the image strips may be used for lateral tracking (parallel changes of the head position) as well as for frontal tracking (distance changes of the head position) of the stereo zones. In the case of lateral tracking, all image strips are laterally shifted at the same time. In the case of (frontal) depth tracking (z tracking), the distance s of the focuses between the left and the right image strip has to be altered, s being:

$$s = \frac{1}{2} \cdot L \cdot (1 - a/z).$$

Calculation Example

The pixel pitch of conventional 17" or 21" liquid crystal (LC) matrix screens has a value of 0.264 mm. The eye distance amounts to an average of P=65 mm. The distance L of the strips in the slot mask representing a barrier raster is determined to be L=0.52586.

In the case of a nominal observer distance of 600 mm, the distance between the LC matrix screen and the slot raster amounts to a=2.45 mm, resulting in the following connection between distance z and the focus distance s ($\Delta z$ is the deviation from the nominal observer distance):

| z | $\Delta z$ | s | $(s - p) \cdot 10^3$ | $(s - p)/p \cdot 10^4$ |
|---|---|---|---|---|
| 450 | −150 | 0.264356 | 0.356 | 14 |
| 475 | −125 | 0.264281 | 0.281 | 11 |
| 500 | −100 | 0.264214 | 0.214 | 8 |
| 525 | −75 | 0.264153 | 0.153 | 6 |
| 550 | −50 | 0.264097 | 0.097 | 4 |
| 575 | −25 | 0.264046 | 0.046 | 2 |
| 600 | 0 | 0.264 | 0 | 0 |
| 625 | 25 | 0.263957 | −0.043 | −2 |
| 650 | 50 | 0.263918 | −0.082 | −3 |
| 675 | 75 | 0.263881 | −0.119 | −5 |
| 700 | 100 | 0.263847 | −0.153 | −6 |
| 725 | 125 | 0.263816 | −0.184 | −7 |
| 750 | 150 | 0.263786 | −0.214 | −8 |

For the nominal observer distance of 750 mm, the distance between the LC matrix screen and the slot raster amounts to a=3.05 mm, resulting in the following connection between distance 2 and the focus distance s:

| z | $\Delta z$ | s | $(s - p) \cdot 10^3$ | $(s - p)/p \cdot 10^4$ |
|---|---|---|---|---|
| 600 | −150 | 0.264267 | 0.267 | 10 |
| 625 | −125 | 0.264214 | 0.214 | 8 |
| 650 | −100 | 0.264164 | 0.164 | 6 |
| 675 | −75 | 0.264119 | 0.119 | 5 |
| 700 | −50 | 0.264076 | 0.076 | 3 |
| 725 | −25 | 0.264037 | 0.037 | 1 |
| 750 | 0 | 0.264 | 0 | 0 |
| 775 | 25 | 0.263966 | −0.034 | −1 |
| 800 | 50 | 0.263933 | −0.067 | −3 |
| 825 | 75 | 0.263903 | −0.097 | −4 |
| 850 | 100 | 0.263874 | −0.126 | −5 |
| 875 | 125 | 0.263847 | −0.153 | −6 |
| 900 | 150 | 0.263822 | −0.178 | −7 |

By means of frontal tracking, the stereo-channels may be tracked to the observer in an in-depth resolution of approximately 25 mm to 50 mm. According to the values represented in the table, this means that in order to guarantee this in-depth resolution it must be possible to change the distance of the focuses in stages having the following length:

$$\delta = (s-p) = 3/10000 \cdot p = 0.0003 \cdot p$$

I.e., $p/\delta$ should be more than 3000.

| N | $2^N$ | $p/\delta 1$ | $p/\delta 2$ |
|---|---|---|---|
| 8 | 256 | 768 | 1536 |
| 9 | 512 | 1536 | 3072 |
| 10 | 1024 | 3072 | 6144 |

The following can be derived from this table: For process 1, the resolution of the weighting function has to be at least N=10 bits, and at least 9 bits for process 2. If the focus relocation is distributed over three lines, process 2 would provide a sufficient resolution for a display having image elements that may be varied in 256 stages. This also applies to process 1 if distribution takes place over four lines, and to process 2 if distribution takes place over two lines.

A more precisely graduated resolution may be achieved by implementing a time-dependent dittering of the described measures into the above-described processes.

REFERENCE LIST a distance between matrix screen and barrier raster
B blue
BE observer level
BSL image column from left view
BSR image column from right view
$\delta$ focus relocation
D dark
G green
GEW weighting function
H bright
$I_n$ intensity factor
IS intensity focus
L distance of the barrier elements (pitch)
M intensity parts
MB matrix screen
n number of subpixels including reserve within a subpixel group
N discrete steps for changing the intensity
p width of subpixel group
P eye distance
PE pixel level
PR right view pixel
R red
RELIN relative intensity (brightness)
PL left view pixel
s distance of intensity focuses
SE slot level
SP colour subpixel
X pixel line
z observer distance to matrix screen
$\Delta z$ deviation from the nominal observer distance

The invention claimed is:

1. A method for an autostereoscopic presentation of image information on a matrix screen having a barrier raster having barrier elements being arranged in parallel to said matrix screen, the method comprising:
   assigning subpixel groups to said barrier elements, said subpixel groups being combined to form image lines on the matrix screen, each of the subpixel groups having n subpixels including a subpixel reserve and being variable in their intensity,
   in which a screened subpixel excerpt from a right and from a left stereo image view being displayed on the subpixels are fed to the right and to the left eye of an observer via the barrier raster in a correct allocation,
   tracking at least horizontally the image information relative to the matrix screen with respect to an initial position in the center of the matrix screen by proportionally shifting intensity focuses of the subpixel group and by re-allocating image information to the subpixels becoming visible to the respective other eye when detected horizontal parallel alterations of a head position of the observer,
   initially forming intensity focuses of the subpixel groups depending on the position of the observer, and reducing the total intensity of the matrix screen to at least a value of (n−1)/n of the total intensity of the matrix screen, and when detected parallel changes of the observer's head position relative to the matrix screen, subsequently laterally shifting in a continuous manner said intensity focuses of the subpixel groups, while maintaining the reduced total intensity within the subpixel groups in the image lines;

widening the intensity focuses for an approach and compressing the intensity focuses for a more distance position of the observer's head relative to the matrix screen, the widening and, the compressing being inversely proportional when the barrier raster is arranged in front of the matrix screen in the direction of viewing and directly proportional when the barrier raster is arranged behind the matrix screen in the direction of viewing in the case of detected changes of the distance of the observer's head position relative to the matrix screen increasing towards the lateral edges of the matrix screen; in which the shifting, the widening or the compressing of the intensity focuses of the subpixel groups takes place by changing the intensity of the subpixels accordingly via directly adjacent subpixels in the image lines, depending upon the size of the parallel change and distance change, even across boundaries between the adjacent subpixel groups of differing stereo image views and released subpixels involved in the adjacent subpixel group of the respective other stereo image view; and wherein current head position of the observer is determined by involving a tracking method, in particular a video-based tracking method for locating head and eye details of the observer, and a recording setting for the stereo image views is carried out dynamically depending on current position of eyes determined by the tracking method.

2. A method for an autostereoscopic presentation of image information on a matrix screen having a barrier raster having barrier elements being arranged in parallel to said matrix screen, the method comprising:

assigning subpixel groups to said barrier elements, said subpixel groups being combined to form image lines on the matrix screen, each of the subpixel groups having n subpixels including a subpixel reserve and being variable in their intensity, in which a screened subpixel excerpt from a right and from a left stereo image view being displayed on the subpixels are fed to the right and to the left eye of an observer via the barrier raster in a correct allocation, tracking at least horizontally the image information relative to the matrix screen with respect to an initial position in the center of the matrix screen by proportionally shifting intensity focuses of the subpixel group and by re-allocating image information to the subpixels becoming visible to the respective other eye when detected horizontal parallel alterations of a head position of the observer, initially forming intensity focuses of the subpixel groups depending on the position of the observer, and reducing the total intensity of the matrix screen to at least a value of (n−1)/n of the total intensity of the matrix screen, and when detected parallel changes of the observer's head position relative to the matrix screen, subsequently laterally shifting in a continuous manner said intensity focuses of the subpixel groups, while maintaining the reduced total intensity within the subpixel groups in the image lines;

widening the intensity focuses for an approach and compressing the intensity focuses for a more distance position of the observer's head relative to the matrix screen, the widening and, the compressing being inversely proportional when the barrier raster is arranged in front of the matrix screen in the direction of viewing and directly proportional when the barrier raster is arranged behind the matrix screen in the direction of viewing in the case of detected changes of the distance of the observer's head position relative to the matrix screen increasing towards the lateral edges of the matrix screen; in which the shifting, the widening or the compressing of the intensity focuses of the subpixel groups takes place by changing the intensity of the subpixels accordingly via directly adjacent subpixels in the image lines, depending upon the size of the parallel change and distance change, even across boundaries between the adjacent subpixel groups of differing stereo image views and released subpixels involved in the adjacent subpixel group of the respective other stereo image view;

wherein a change in the intensity of the subpixels is described by a periodic function whose period length corresponds to the width of the subpixel group and which is applied to all lines of each section of the matrix screen.

3. The method of claim 2, wherein vertical parallel changes of the observer's head position with regard to the matrix screen are also considered in the case of a slanted barrier raster or slanted subpixels by means of a further intensity factor.

4. The method of claim 2, wherein the shifting, widening or compressing of the intensity focuses of the subpixel groups is carried out by multiplying the intensity of the subpixels with intensity factors determined depending changes of the head position, whereby the intensity factors are scaled to a maximum intensity of the subpixels and the different intensity factors may be summed up.

5. The method of claim 2, wherein the stereo image views are presented time-sequentially by using a switchable barrier raster.

6. The method of claim 2, wherein the subpixels comprise polychromatic or monochromatic intensities and are arranged vertically or in a slanted manner comprising a line-by-line displacement of one subpixel, the barrier elements of the associated barrier raster also being vertical or slanted.

7. The method of claim 2, wherein subpixels are extracted from a multitude of subpixel excerpts, whereby no redundant subpixel excerpts are used.

8. The method of claim 2, wherein current head position of the observer is determined by involving a tracking method, in particular a video-based tracking method for locating head or eye details of the observer.

9. The method of claim 8, wherein a recording setting for the stereo image views is carried out dynamically depending on current position of eyes determined by the tracking method.

10. The method of claim 2, wherein the distance of the upstream or downstream barrier raster to the matrix screen is variable.

* * * * *

UNITED STATES PATENT AND TRADEMARK OFFICE
CERTIFICATE OF CORRECTION

PATENT NO. : 8,319,824 B2
APPLICATION NO. : 12/346062
DATED : November 27, 2012
INVENTOR(S) : René de la Barré, David Przewozny and Siegmund Pastoor It is certified that error appears in the above-identified patent and that said Letters Patent is hereby corrected as shown below:

On The Title Page,

Item (75), in the first line, replace -- Barre -- with Barré

Item (73), in the second line, replace -- Forderung -- with Förderung

Signed and Sealed this
Second Day of April, 2013

Teresa Stanek Rea
*Acting Director of the United States Patent and Trademark Office*